(12) United States Patent
MacCormack et al.

(10) Patent No.: US 7,730,515 B1
(45) Date of Patent: Jun. 1, 2010

(54) DIGITAL RECEIVER DEMULTIPLEXER

(75) Inventors: Andrew MacCormack, Bristol (GB); Howard Gurney, Bristol (GB); William Robbins, Bristol (GB); Fabrizio Rovati, Cinisello Balsamo (IT)

(73) Assignee: STMicroelectronics Ltd., Bristol (GB)

( * ) Notice: Subject to any disclaimer, the term of this patent is extended or adjusted under 35 U.S.C. 154(b) by 973 days.

(21) Appl. No.: 09/239,907

(22) Filed: Jan. 29, 1999

(30) Foreign Application Priority Data

Jan. 30, 1998 (GB) ................................. 9802093.6

(51) Int. Cl.
H04N 7/16 (2006.01)
(52) U.S. Cl. ................... 725/139; 725/131; 725/151; 725/68; 725/100
(58) Field of Classification Search ............ 370/485, 370/487, 471, 493, 535, 536; 725/139, 151
See application file for complete search history.

(56) References Cited

U.S. PATENT DOCUMENTS

| 5,521,979 | A |   | 5/1996  | Deiss ........................... 380/20 |
| 5,602,920 | A |   | 2/1997  | Bestler et al. ................ 380/49 |
| 5,684,804 | A |   | 11/1997 | Baronetti et al. ............. 370/509 |
| 5,742,361 | A |   | 4/1998  | Nakase et al. ............... 348/845 |
| 5,835,591 | A | * | 11/1998 | Cochon et al. ............... 380/212 |
| 5,844,595 | A | * | 12/1998 | Blatter et al. ................. 455/83 |
| 5,864,358 | A |   | 1/1999  | Suzuki et al. ................ 348/10 |
| 5,920,572 | A |   | 7/1999  | Washington et al. ........ 370/535 |
| 5,935,245 | A | * | 8/1999  | Sherer ......................... 709/200 |
| 5,959,659 | A | * | 9/1999  | Dokic ......................... 725/152 |
| 6,002,694 | A | * | 12/1999 | Yoshizawa et al. .......... 370/486 |

(Continued)

FOREIGN PATENT DOCUMENTS

EP 0 735 776 A2 10/1996

(Continued)

OTHER PUBLICATIONS

Coding of Moving Pictures and Associated Audio: Systems (ISO/IEC JTC1/SC 29/WG11 N0801, Published on Nov. 13, 1994 by the ISO/IEC Copyright Office, Geneva, Switzerland).*

(Continued)

*Primary Examiner*—Joseph Hirl
*Assistant Examiner*—Fred Peng
(74) *Attorney, Agent, or Firm*—Lisa K. Jorgenson; Timothy L. Boller; Seed IP Law Group PLLC

(57) ABSTRACT

The present invention relates to the demultiplexing of a digital data stream in a receiver so as to retain only those parts of the digital data stream required by the receiver. Such demultiplexing is particularly useful when applied to a receiver circuit in a television system having a digital set-top-box.

A memory in the receiver stores packet identifiers of data packets required by the receiver, which are stored in the memory under the control of a first control circuit. A second control circuit extracts packet identifiers from incoming data packets in an input digital data stream. A third control circuit receives the extracted packet identifier and determines whether this matches one of the packet identifiers stored in the memory. A match signal is set by the third control circuit to the second control circuit responsive to a match. The second control circuit demultiplexes the input data packet responsive to the match signal.

24 Claims, 10 Drawing Sheets

U.S. PATENT DOCUMENTS

| | | | |
|---|---|---|---|
| 6,026,088 A * | 2/2000 | Rostoker et al. | 370/395.53 |
| 6,088,357 A * | 7/2000 | Anderson et al. | 370/392 |
| 6,111,896 A | 8/2000 | Slattery et al. | 370/535 |
| 6,134,272 A * | 10/2000 | Rim | 375/240.27 |
| 6,175,577 B1 | 1/2001 | Van Den Heuvel | 370/537 |
| 6,185,228 B1 | 2/2001 | Takashimizu et al. | 370/535 |
| 6,229,801 B1 * | 5/2001 | Anderson et al. | 370/349 |
| 6,275,507 B1 * | 8/2001 | Anderson et al. | 370/487 |
| 6,477,185 B1 * | 11/2002 | Komi et al. | 370/536 |
| 6,859,850 B1 * | 2/2005 | MacCormack | 710/52 |
| 2004/0004977 A1 * | 1/2004 | Robbins et al. | 370/535 |

FOREIGN PATENT DOCUMENTS

EP    0 714 213 B1    3/2002

OTHER PUBLICATIONS

"ADSP-2100 Family User's Manual—Chapter 4: Data Transfer", [online] [retrieved on May 21, 2003] Retrived from Analog Devices web site using Internet <URL: http://www.analog.com/Analog_Root/static/library/dspManuals/ADSP-2100_fum_books.htmll>.*

"ADSP-2100 Family User's Manual—Chapter 1: Introduction", [online] [retrieved on Dec. 1, 2003] Retrieved from Analog Devices web site using Internet <URL: http://www.analog.com/Analog_Root/static/library/dspManuals/ADSP-2100_fum_books.htmll>.*

"Design Architecture for MPEG2 Demultiplexer Assist", *IBM Technical Disclosure Bulletin*, vol. 39 No. 4 Apr. 1996, 283-286, XP000587499.

* cited by examiner

DIGITAL RECEIVER DEMULTIPLEXER

FIELD OF THE INVENTION

The present invention relates to demultiplexing of a digital data stream in a receiver, so as to retain only those parts of the digital data stream required by the receiver. The invention relates particularly but not exclusively to such a receiver circuit in a television system having a digital set-top-box receiver.

BACKGROUND TO THE INVENTION

In digital television systems, a television is provided with a set-top-box to receive and decode a broadcast digital data stream which contains program information for display on the television. The broadcast digital data stream may arrive at the set-top-box via a satellite or cable system, via a digital terrestrial system, or via a disk or tape. A disk or tape, such as a CD ROM drive in a personal computer, may provide digital video information for display on a monitor.

There are various known standards for digital video broadcasting (DVB) and one now commonly used standard is the MPEG-2 standard.

In the MPEG-2 DVB standard data is encoded into transport packets. Each transport packet is defined by the standard as consisting of 188 bytes, comprising 4 header bytes and 184 payload bytes ("the data payload"). For transmission, the transport packets are time division multiplexed into a transport stream. At the receiver in the set-top-box, the transport stream is demultiplexed to recover the transport packets. optionally the transport packets may be scrambled and encoded with error correction information for transmission, and then descrambled and error-checked at the receiver.

The data payload in the transport packets is, according to the MPEG-2 standard, one of two types. The first type is known as a packetized elementary stream (PES), and the second type is known as program specific information (PSI).

The packetized elementary streams (PESs) form the video, audio and private data information of the broadcast. The MPEG-2 transport stream is made up of one or more PESs (either video, audio or private). The MPEG-2 transport stream is primarily intended for the transport of TV programs over long distances. This type of stream can combine, in the same multiplex, many programs, each of them being composed of one or more PESs. In order that the receiver can cope with this mix of program information, the MPEG-2 standard defines four types of tables, which together make up the MPEG-2 program specific information (PSI).

Each table of the PSI is made up of one or more sections, there being a maximum of 256 sections for each table. The MPEG-2 tables are defined in the standard, and include a program allocation table, a program map table, a conditional access table and private tables. The European DVB standard additionally defines complementary service information tables. The basic service information tables are the network information table, service description table, event information table, and time and date table. The optional service information tables are the bouquet association tables, running status tables, and stuffing tables. Each section includes an optional cyclic redundancy code (CRC) check.

A PES packet always starts at the beginning of the payload part of a transport packet and ends at the end of the transport packet. Sections, however, do not necessarily start at the beginning nor finish at the end of a transport packet. For a section, the transport packet can start with the end of another section.

At each decoder or set-top-box, the transport stream is decoded. To achieve the decoding of the transport stream, each set-top-box is provided with a transport interface, which provides an interface between the transport stream input to the box and the actual MPEG-2 decoders which decode the audio and video information and sections broadcasts.

The transport interface demultiplexes the transport stream to retain only those transport packets which are required by the particular set-top-box for decoding. The transport stream is a set of different services time division multiplexed, and the purpose of the transport interface is to demultiplex them. At a front input end of the transport interface, a time demultiplex function is performed to separate the transport stream into its component transport packets.

Each transport packet has associated therewith in its header a packet identifier (PID) which identifies the type of packet and various information associated with the data in the packets including the type of packet (PES or PSI). Each particular receiver or set-top-box is only interested in receiving packets having packet identifiers of interest to the particular set-top-box, for instance those associated with a particular television program selected for viewing. Thus once the incoming transport stream has been time demultiplexed to recover the transport packets, it is necessary to further demultiplex the transport packets to retain only those having packet identifiers required by the receiver.

The transport interface merely uses the header of PES transport packets to demultiplex them, and stores the data payload of the demultiplexed packets in the memory. The transport interface similarly demultiplexes PSI transport packets, but then filters the sections of the demultiplexed packets to retain only sections required by the receiver, before storing the filtered sections in the memory without any further processing.

Although the MPEG-2 DVB standard is one of the main digital video broadcast standards, there are variations within the standard. It is desirable to provide receivers having decoders which are generally as flexible possible not only to cope with variations in the standard but, if necessary, to enable the receiver to be used with a different standard.

It is therefore generally desirable to provide a single receiver which provides the flexibility of enabling different types of digital video broadcast standards to be used by utilizing a programmable transport interface. Utilizing such a receiver in a set-top-box may enable the set-top-box to be switched between two or more types of syntax format associated with different standards in situ.

There are known techniques for performing the demultiplexing of the time multiplexed MPEG-2 transport packets. One known technique is an application specific integrated circuit (ASIC) hardware implementation in which a dedicated hardware design parses the transport packets with no flexibility. That is the packet identifiers of the incoming transport packets are passed to a custom circuit block which detects whether the PID of the incoming transport packet matches any of the PIDs associated with a particular receiver. A major drawback of this hardware custom solution to the demultiplexing of transport packets is the lack of flexibility in syntax parsing. Although it is possible to select the PID numbers to be searched for in the custom circuit, it is not possible to alter the algorithm applied in the custom circuit once it has been set up. Thus, there is no flexibility to allow for the change in behavior of the receiver on the incoming digital data stream. This heavily reduces the lifetime of each chip, its range of applications, and its general ability to react to changes in standards or even requirements.

A second known technique for demultiplexing of MPEG-2 transport packets is that based on the main processor CPU of the receiver set-top-box, in which a program runs on the CPU for performing the demultiplex operation. Such an operation gives full flexibility of algorithms, with the PIDs associated with the receiver and to be searched for stored in the main processor CPUs memory. Thus, this gives full flexibility of algorithms in that the contents of the CPU main processor memory can be readily changed. However, this requires the main processor CPU to carry out itself directly the demultiplexer operation, which places a heavy load on the CPU. This limits the availability of the main processor CPU to perform other operations for running the set-top-box. As the amount of operations required to be performed by the set-top-box increases, together with the increasing complexity of those operations, this demand on the processing power of the main processor CPU becomes increasingly undesirable.

SUMMARY OF THE INVENTION

It is therefore an object of the present invention to provide a programmable transport interface in which the demultiplexing of the incoming data stream is programmable to so as to enable different standards to be multiplexed without placing a burden on the main processor of the decoder.

According to the present invention there is provided a receiver for demultiplexing a digital data stream, the digital data stream including data packets each having a packet identifier, so as to retain only those data packets required by the receiver, the receiver comprising input circuitry for inputting the digital data stream, a memory for storing all packet identifiers of data packets required by the receiver, a first control circuit for controlling the storage in the memory of the packet identifiers, a second control circuit for extracting a packet identifier from a data packet in the digital data stream input to the input circuitry and a third control circuit for receiving the extracted packet identifier and determining whether such matches one of the packet identifiers stored in the memory, and for setting a match signal to the second control circuit responsive to a match, wherein the second control circuit demultiplexes the input data packet responsive to the match signal.

The invention also provides a method of demultiplexing a digital data stream input to a receiver, the digital data stream including data packets each having a packet identifier, so as to retain only those data packets required by the receiver, comprising the steps of inputting the digital data stream, storing in a memory, under the control of a first control circuit, all packet identifiers of data packets required by the receiver, extracting, under the control of a second control circuit, a packet identifier from a data packet in the input digital data stream, determining, under the control of a third control circuit, whether the extracted packet identifier matches one of the stored packet identifiers, setting a match signal responsive to a match determined by the third control circuit; and demultiplexing, under the control of the second control circuit, the input data packet responsive to the match signal.

BRIEF DESCRIPTION OF THE DRAWINGS

The invention will now be described with reference to the accompanying drawings, in which.

DESCRIPTION OF PREFERRED EMBODIMENT

In the following description the present invention is described with reference to an exemplary embodiment in which an MPEG-2 transport stream is demultiplexed in a programmable transport interface of a receiver in a digital set-top-box. It will be apparent, however, that the present invention is not limited to such an application and does in fact have broader applicability to other types of digital data and other types of application.

Figure 1:
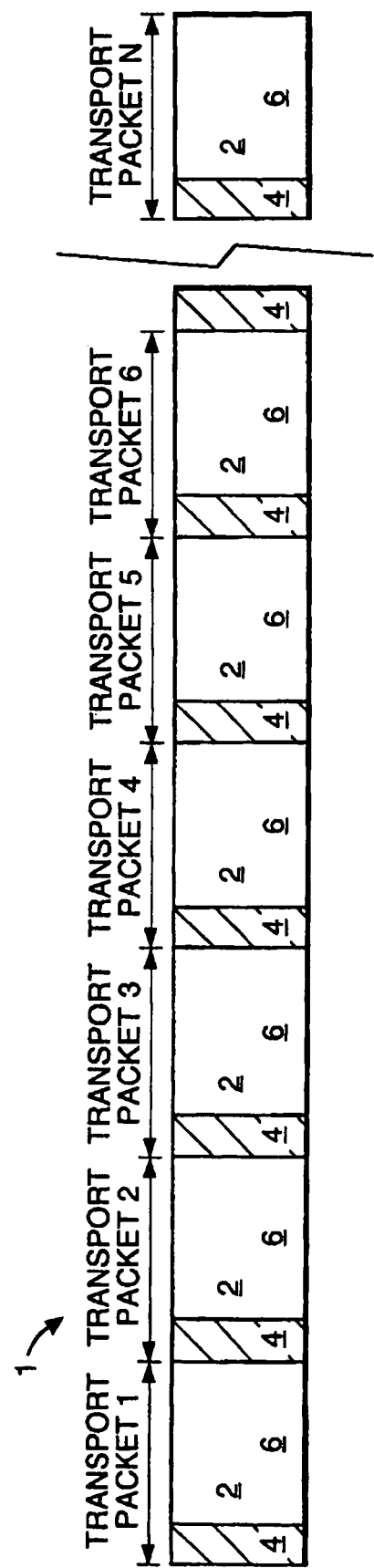
FIG. 1 illustrates a portion of a transport stream.

FIG. 1 illustrates a portion of a transport stream 1 which is composed of a series of N transport packets 2. Each transport packet 2 comprises a transport packet header 4 and a transport packet payload 6. The transport stream is a bit stream which carries in the transport packet payloads 6 information for recreating, for example, a number of different television programs. The transport stream is formed by source encoding the television programs. The transport stream is then typically channel encoded for transmission (by satellite or cable) and channel decoded on its reception to reproduce the transport stream. The transport stream is then source decoded to recreate a selected one of the different television programs. Each particular television program requires three types of information (audio information, video information and tables of program information) for its recreation. Each transport packet 2 is preferably associated with a particular television program, a particular source encoding time and a particular one of the information types. The individual transport packets are time division multiplexed to form the transport stream and allow the real-time recreation of any one of the different television programs from the transport stream. To recreate a television program the transport stream is sequentially demultiplexed to recover only the transport payloads 6 of audio information, video information and tables of program information which are associated with the selected television program. The recovered payloads are then decoded and used to recreate the television program.

According to the MPEG-2 digital video broadcast (DVB) standard each of the transport packets 2 is 188 bytes long and the transport packet header 4 is 4 bytes long. The transport packet payload 6 contains either audio or video information or sections. The sections are parts of tables. The audio and video information and the sections in the payloads 6 are packetized and encoded in accordance with the MPEG-2 DVB compression standard.

Figure 2:
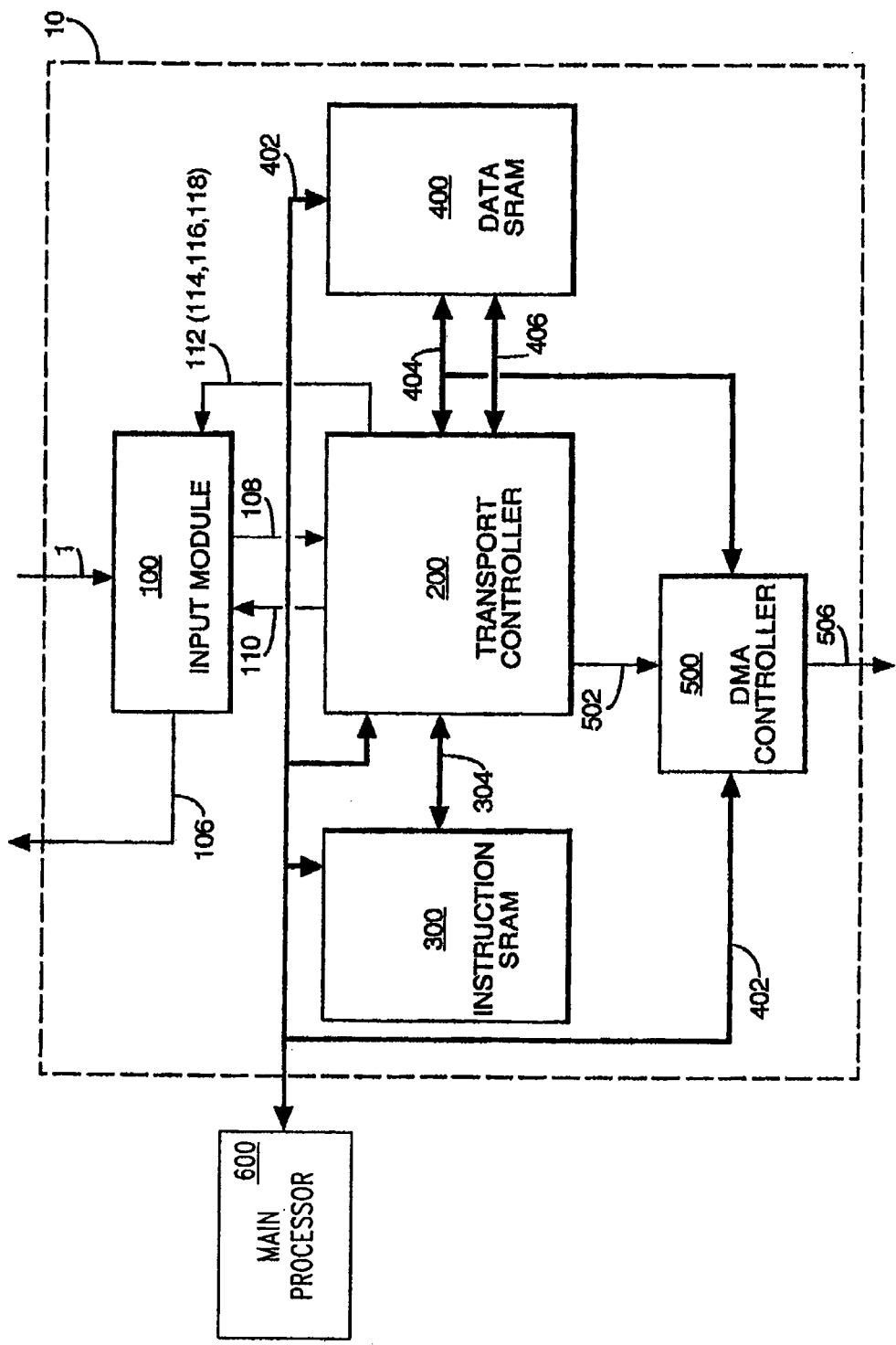
FIG. 2 illustrates in block schematic form a programmable transport interface.

A programmable transport interface 10, illustrated in FIG. 2, is used to process a transport stream 1 and produce a data output stream 506 suitable for reconstitution as a television program after MPEG-2 decoding by MPEG-2 decoders (not shown). The programmable transport interface 10 is included in a receiver which receives the transport stream 1.

The transport packet header 4 contains a synchronization byte which identifies the beginning of each transport packet 2. The transport packet header also contains a packet identification (PID) which identifies the information type and the television program associated with the transport packet payload 6. The transport packet 2 also contains information identifying the source encoding time of the transport packet. The transport packet header 4, including the synchronization byte and the PID, is not scrambled. The transport packet payload 6 may be scrambled.

The programmable transport interface (PTI) 10 performs various functions including:

i) using the synchronization byte to identify the start of a transport packet 2;

ii) using the packet identification (PID) to identify, amongst other functions, the type of information contained in the packet (i.e. audio or video information or sections) and the television program it represents;

iii) descrambling the transport packet payloads 6; and iv) demultiplexing the transport stream 1 to produce a data output stream 506.

The data output stream 506 comprises a stream of audio information associated with the selected television program, a stream of video information associated with the selected television program, or tables of program information associated with the selected television program. The PTI outputs these streams to the necessary MPEG-2 decoders to reproduce the selected television program.

The programmable transport interface 10 comprises five primary functional blocks: an input module 100; a transport controller 200; an instruction SRAM (static RAM) 300; a data SRAM (static RAM) 400; and a multi-channel DMA (direct memory access) controller 500.

The input module 100 receives the transport stream 1, and outputs an alternative output stream 106. The input module 100 identifies the synchronization byte of each transport packet which is used to synchronize the system clock and the transport stream. The input module 100 is controlled by the transport controller 200 via an input module control signal 112 which includes a descrambling control signal 114, an alternative stream control signal 116 and output stream control signals 118. The input module 100 provides bits to the transport controller 200 via an interconnect 108 and it receives bits back from the transport controller 200 via the interconnect 110. The input module, under the control of the transport controller 200 via the input module control signal 112, descrambles the payload 6 of selected transport packets 2 and supplies the selected descrambled payloads to the transport controller 200 via the interconnect 108. The descrambling of the payloads is controlled by the descrambling control signal 114 supplied by the transport controller 200 and the number and rate of bits supplied on the interconnect 108 is controlled by the output stream control signal 118. The input module 100 receives, along the interconnect 110, bits from the transport controller 200 which may be output as the alternative output stream 106 under the control of the alternative stream control signal 116.

The transport controller 200 operates on the bits received on interconnect 108 from the input module 100. The transport controller 200 receives from the input module 100 via interconnect 108 the transport packet header 4 of the transport packet 2 arriving at the transport stream input interface 102. The transport controller 200 uses the packet identifier (PID) in the transport packet header 4 to determine whether the transport packet 2 now entering the input module 100 is associated with a selected television program for the programmable transport interface 10. If it is not, the received transport packet 2 is discarded. If it is, it controls the input module 100 to descramble (if necessary) the transport packet payload (as described above), and to supply the transport packet payload 6 via the interconnect 108 to the transport controller 200. The transport controller 200 may pass a payload 6 associated with audio or video information for the selected program straight to the transport controller output 502. If the payload 6 relates to a section of a table the transport controller 200 may further process the information before providing it at its output 502. Alternatively the transport controller 200 may process the received payloads 6 and repacketize them in accordance with a different transmission standard. The reformatted transport stream is then provided to the input module 100 via the interconnect 110 and it is output as the alternative output stream 106 under the control of the alternative stream control signal 116.

The transport controller 200 comprises a transport processor (not shown) which reads instruction sets from the instruction SRAM 300. The transport controller 200 is connected to the SRAM 300 by interconnect 304 and it reads its instructions via the interconnect 304. A system processor (not shown) may read and write to the instruction SRAM 300 via a system interconnect bus 402. However, the transport controller 200 has preferential access to the instruction SRAM 300 determined by an arbiter (not shown) which arbitrates between accesses by the transport controller 200 and the system processor. The system processor may also access the transport controller 200 via the system interconnect bus 402.

The data SRAM 400 can be accessed by the processor of the, transport controller 200 via the interconnections 404 and 406. The processor of the transport controller uses the interconnection 404 to read from and write to the data SRAM 400. A search engine within the transport controller 200 reads from the data SRAM 400 along interconnection 406. The search engine searches the data SRAM 400 for the packet identifier (PID) in the incoming transport packet header 4. If the packet is not to be discarded, then the PID for that packet will have been stored in the data SRAM, and is located by the search engine of the transport controller. Associated with each PID in the data SRAM is a plurality of pointers, which point to other addresses in the data SRAM where other information associated with the incoming transport packet is stored. The search engine retrieves a pointer stored with a particular PID for use by the transport controller processor. The transport controller processor then uses the pointers to access all the information it needs to process the payload of the incoming transport packet. The pointers may, for example: point to descrambling keys for use by the input module 100; point to addresses for use by the DMA controller 500; identify whether the payload is video or audio information or sections, identify whether the payload is special data to be output on alternative output stream 106; or locate information for masking the search filter etc. A detailed description of the operation of the search engine of the transport controller 200 in reading the data SRAM 400 is given hereinafter.

This information enables the transport controller to generate the input module control signals 112 as appropriate, and control the processing, if any, of the bits received on interconnect 108.

The transport controller 200 produces a transport controller output 502 which is supplied to the multi-channel DMA controller 500. The multi-channel DMA controller 500 supplies the data output stream 506, indirectly, to the MPEG-2 decoders (not shown). A full description of the DMA controller 500 can be found in pending U.S. patent application Ser. No. 09/240,176.

The system processor writes to each of the instruction SRAM 300, the transport controller 200 and the data SRAM 400 via the system interconnect bus 402. The instruction SRAM 300 can only be written to by the system processor: the transport controller can only read from, and not write to, its own instruction SRAM 300 via the interface 304. The system processor can also read from the instruction SRAM. An arbiter is provided to arbitrate between accesses to the instructions SRAM 300 by both the system processor and the transport controller 200.

The system processor, via the system interconnect bus 402, and the transport controller 200 via interface bus 404, can both read and write to the data SRAM 400. The search engine of the transport controller 200 can only read from the data SRAM 400 via interface bus 406. An arbiter is provided to arbitrate accesses to the data SRAM 400 by each of the system processor, the transport controller 200, and the search engine within the transport controller 200. Access to the data SRAM 400 is arbitrated with the following order of priority: the search engine within the transport controller 200 has highest priority, the transport controller processor next priority, and the system processor lowest priority. The transport controller may be reset by the system processor by a reset signal on the interface bus 302.

The system processor, via system interconnect bus 402, and the transport controller 200 via the bus 404, can both read and write to registers within the DMA controller 500. An arbiter is provided to arbitrate between the system processor and transport controller access to the DMA controller.

The system processor via system interconnect bus 402 also accesses registers within the transport controller 200, to read and write thereto.

The system processor initially writes to the instructions SRAM 300, the data SRAM 400, and registers within the transport controller 200 and the DMA controller 500, to configure them.

Figure 3:
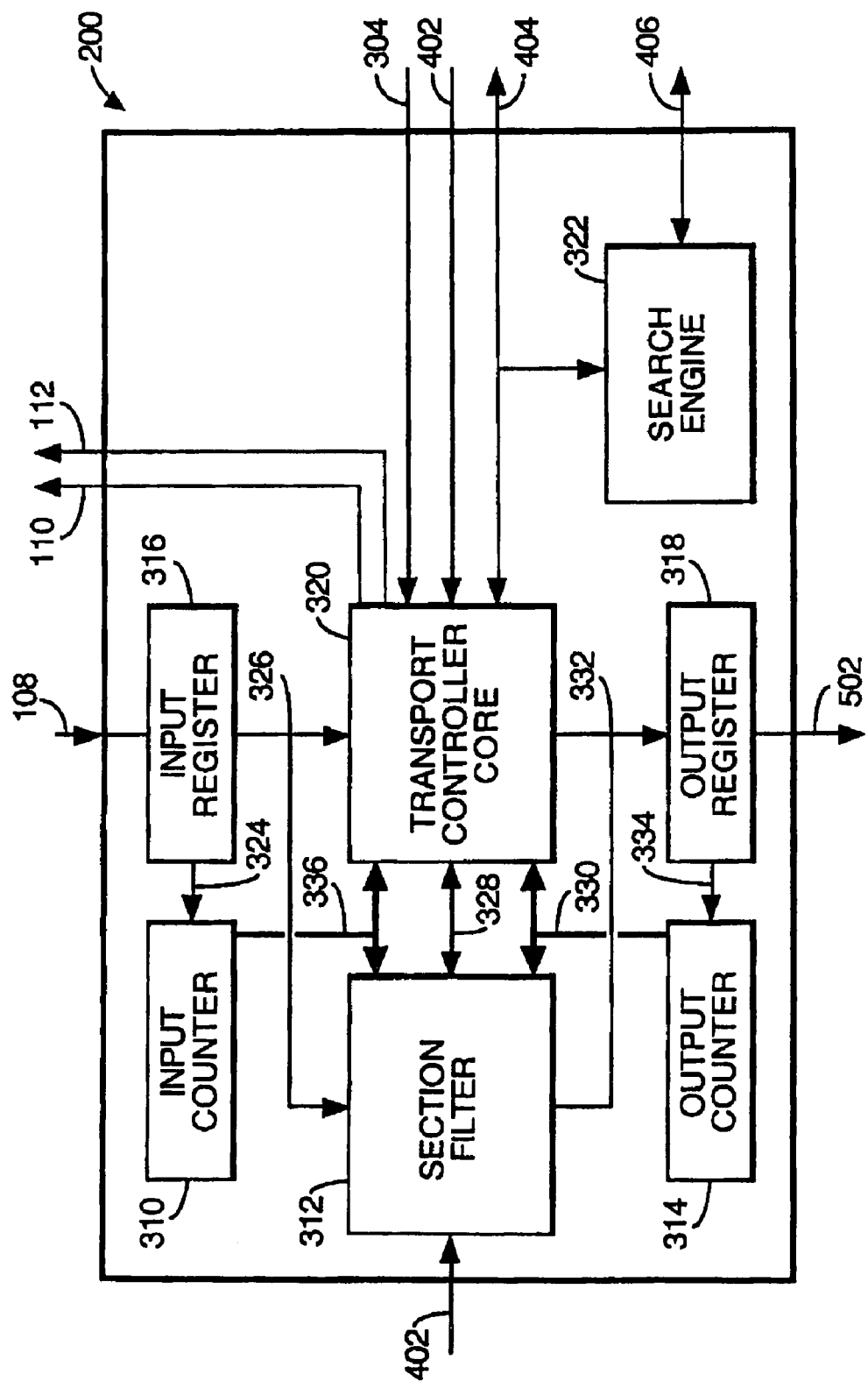
FIG. 3 is a block diagram of the transport controller of the programmable transport interface according to a preferred implementation of the present invention.

Referring now to FIG. 3, there is shown a block diagram of the main components of the transport controller 200 of the programmable transport interface 10.

The main elements of the transport controller 200 are a transport controller core 320, a section filter 312, an input register 316, an output register 318, an input counter 310, an output counter 314, and a search engine 322.

The input register 316 receives the bits on the interconnect 108 and outputs them on lines 326 to both the transport controller core 320 and the section filter 312. The input register 316 also provides an input on line 324 to the input counter 310, and in turn the input counter 310 provides an input on line 336 to the transport controller core 320 and section filter 312. The transport controller core 320 has bi-directional connections 328 to the section filter 312. In addition, and as described hereinabove with reference to FIG. 2, the transport controller core 320 is connected to the instruction SRAM via the interconnect 304, and is connected to the system processor via the system interconnect bus 402. The transport controller core also accesses the data SRAM 400 via interconnections 404, the interconnections 404 also being connected to the search engine 322. The search engine 322 accesses the data SRAM 400 via the interconnections 406. The transport controller core provides an output on lines 332 which forms an input to the output register 318, the output register 318 providing the output signals on interconnect 502. The output register 318 also provides a signal on line 334 which provides an input to the output counter 314, the output counter 314 in turn providing an output on signal line 330 to the transport controller core 320 and the section filter 312. The section filter 312 also has an output connected to the line 332 to form an input to the output register 318. The section filter can be accessed by the system processor via the system interconnect bus 402. The transport controller core 320 also outputs the signals 112 and the signal 110 directly to the input module 100.

As mentioned hereinabove, the transport controller 200 initially receives from the input module 100 via interconnect 108 the transport packet header 4 of the transport packet 2 arriving at the transport stream input interface 102. The transport packet header 4 is input to the transport controller core 320 via the input register 316. The transport controller core 320 includes the transport processor. As also discussed hereinabove, the transport packet header includes the packet identifier (PID) which identifies the information type and the television program associated with the transport packet payload 6. According to the present invention, the PID is used to demultiplex the arriving transport stream. That is, the transport controller core 320, as will be described in detail hereinafter, uses the PID of the transport packet header to determine whether the transport packet should be retained or discarded by the programmable transport interface 10. If the transport packet is to be retained, then the transport controller core further uses the PID to determine whether the transport packet can be passed straight through the transport controller 200 to its output interface 502, or whether some processing or further action on the transport packet is necessary before transference to the output interface 502 of the transport controller 200.

The operation of the section filter 312, output counter 314, and input counter 310 are not relevant to the discussion of the present invention, and for a full description of the operation of such elements reference should be made to pending U.S. patent application Ser. Nos. 09/239,881 and 09/240,176.

The PID constitutes a certain number of bits of the transport packet header, and particularly in the preferred embodiment of the present invention in which the transport packet conforms to the MPEG-2 standard the PID constitutes 13 bits of the transport packet header. The bit locations of the PID will, in accordance with the MPEG-2 standard, always be in the same location of a transport packet header.

The data SRAM 400 includes therein a set of memory locations which are reserved, each memory location storing a possible valid value of the PID, that is one of those values of the PID for which the incoming transport packet should be retained because the data payload associated with the packet is required by the receiver. All possible values of the PID are stored in this reserved area of memory. Stored with each possible value of the PID, is the necessary information associated therewith for the transport controller core 320 to determine how to process the transport packet, if at all.

The main processor 600 can access the data SRAM 400 via main processor bus 402 to change the valid values of the PID, thus enabling the demultiplexing operation to be changed. Prior to operation of the programmable transport interface, the main processor 600 stores the desired PID values in the data SRAM. Thereafter, the data SRAM can be re-programmed at any time by the main processor 600. Thus, the demultiplexing operation can be dynamically altered in situ by the main processor 600. However, once the main processor 600 has configured the data SRAM, the demultiplexing operation itself is independent of the main processor 600.

In accordance with the present invention, in operation the transport controller core 320 takes the PID of the current transport packet header and transfers it on interconnect bus 404 to the search engine 322, the search engine 322 carrying out the operation of accessing the data SRAM 400 to determine whether the PID is associated with a transport packet which should be retained. The search engine 322 searches the PIDs stored in the data SRAM 400 for a match with the PID of the incoming data packet.

Figure 4:
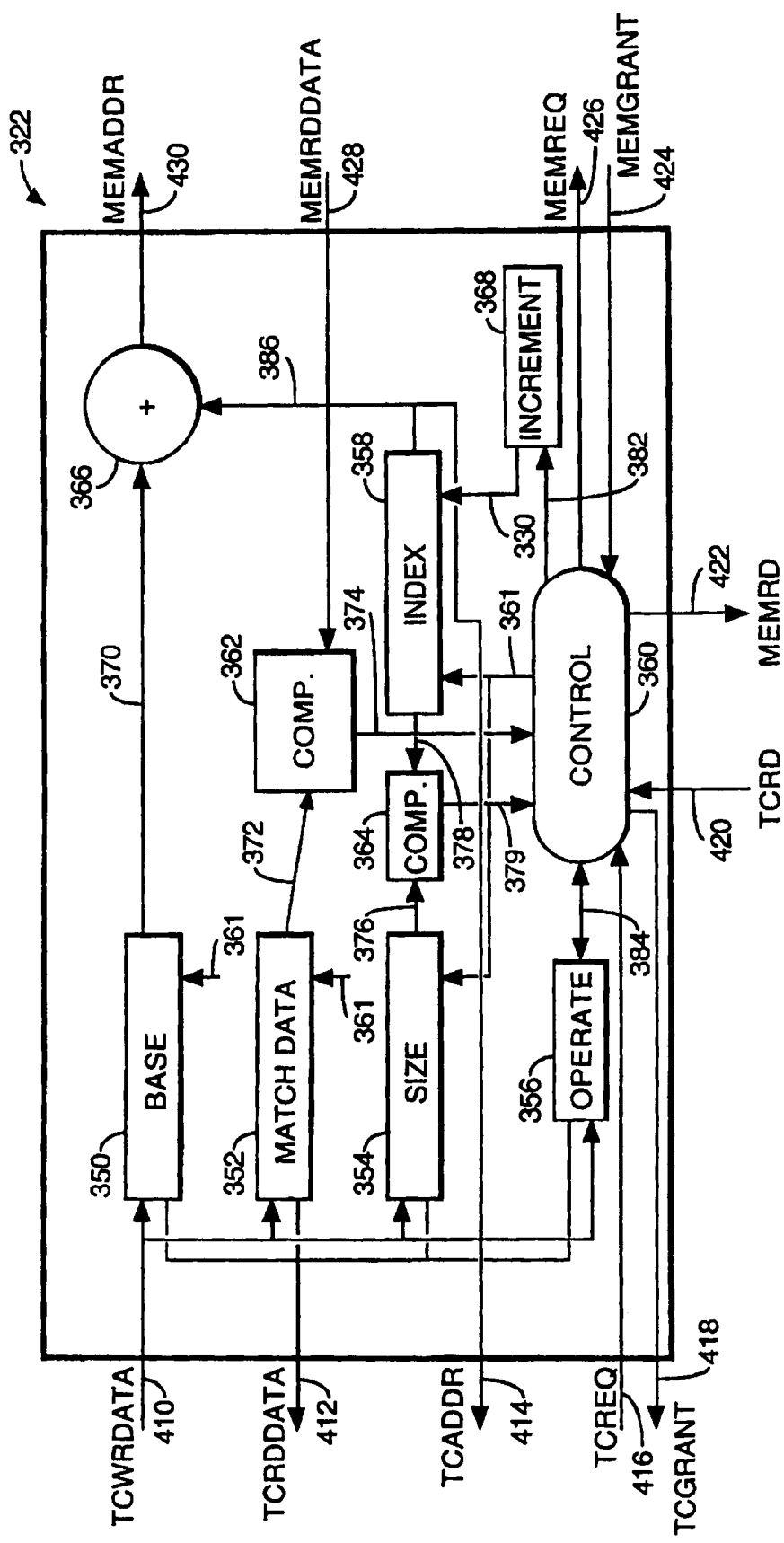
FIG. 4 is a block diagram of the search engine of the transport controller of FIG. 3.

Referring now to FIG. 4, the operation of the search engine 322 will be described in further detail.

The search engine 322 comprises a base address register 350, a match data register 352, a size register 354, an index register 358, control logic 360, an operate register 356, a comparator 362, a comparator 364, an incrementer 368, and an adder 366.

The interconnect bus 404 comprises, in this embodiment, a transport controller write data bus signal TCWRDATA 410, a transport controller read data bus signal TCRDATA 412, a transport controller address bus TCADDR 414, a transport controller request signal TCREQ 416, a transport controller grant signal TCGRANT 418, and a transport controller read signal TCRD 420. The interconnect bus 406 comprises a memory address bus MEMADDR 430, a memory read data bus MEMRDDATA 428, a memory request signal MEMREQ 426, a memory grant signal MEMGRANT 424, and a memory read signal MEMRD 422.

The base address register 350, the match data register 352, the size register 354, and the operate register 356 all receive the transport controller write data bus TCWRDATA 410. The base address register 350, the match data register 352, the size register 354, and—the operate register 356 are also all connected to provide outputs on the transport controller read data bus TCRDDATA 412.

The base address register 350 provides an output on lines 370 which form one input to the adder 366, the other input to the adder 366 on lines 386 being provided by the index register 358.

The match data register 352 provides an output on lines 372 which forms an input to the comparator 362, the other input of the comparator 362 being provided by the memory read data bus MEMRDDATA 428, and the output of the comparator 362 on lines 374 forming an input to the control logic 360.

The size register 354 has an output on lines 376 which forms an input to the comparator 364, the other input to the comparator 364 being provided on lines 378 by the index register 358, and the output of the comparator 364 being provided on line 379 to the control logic 360.

The output 386 of the index register 358 also forms the transport controller address bus TCADDR 414. The index register 358 also receives on line 380 an output signal of the incrementer 368, the incrementer 368 receiving an input on line 382 from the control logic 360.

The operate register 356 and control logic 360 are interconnected via bidirectional signal line 384. The control logic 360 additionally receives as inputs the transport controller request signal TCREQ on line 416, the transport controller read signal TCRD on line 420, and the memory grant signal MEMGRANT on line 424. The control logic 360 additionally outputs the transport controller grant signal TCGRANT on line 418, the memory read signal MEMRD on line 422, and the memory request signal MEMREQ on line 426. In addition, the control logic 360 outputs control signals on lines 361 to the base address register 350, match data register 352, size register 354 and index register 358. In addition, although not shown in FIG. 4 for reasons of clarity, the base register 350, the match data register 352, the size register 354, the operate register 356, the index register 358, the incrementer 368, and the control logic 360 all receive a system clock.

As will now be described, the search engine 322 is used by the transport controller core 320 to search a contiguous block of words within the data SRAM for the first match to a value, and to return an index to the transport controller core 320 so that the transport controller core 320 can find the location in the data SRAM of this match. The search engine must therefore be used once for every transport packet received. In the preferred embodiment of the present invention, the PID can have up to 48 possible values, and therefore the search engine must search through up to 48 possible values of the PID stored in the data SRAM. The time taken to perform this function greatly affects the speed of the overall transport packet parsing, and therefore the provision of the search engine 322 dedicated to this particular operation, and relieving both the transport controller core 320 and the system processor of the task, enables a significant improvement in performance.

The operate register 356 determines whether the search engine is operating or not: the operate register 356 is set to start the search engine, and cleared to stop the search engine. The contents of the base address register 350, the match data register 352, and the size register 354 must be set while the operate register 356 is cleared, i.e. when the search engine is not operating. The base address register 350 is set at the base address of memory where the search operation is to begin. The match data register 352 is set to store the PID of the incoming transport packet header, i.e. the search parameter used by the search engine. The size register 354 is set to indicate the search range of the search engine, i.e. the range of addresses above the base address which are to be searched. The index register 358 is initially cleared, and in operation as described hereinbelow, stores the current offset value from the base address of the address currently being accessed in the data SRAM.

The base address register 350, the match data register 352, the size register 354, and the operate register 356 are all set by the transport controller core 320 via the transport controller write data bus TCWRDATA 410. The transport controller core 320 sets these registers after a standard request/grant protocol is performed between the transport controller core 320 and the control logic 360 of the search engine 322 via the transport controller request signal TCREQ 416 and transport controller grant signal TCGRANT 418. Thereafter, once the transport controller sets the operate register 356, the search engine begins searching under the control of the control logic 360 as described hereinafter.

The control logic 360 of the search engine 322 requests a memory access to the data SRAM 400 via the memory request signal MEMREQ on line 426, and if the request is granted receives the memory grant signal MEMGRANT on line 424. This request/grant protocol is a standard protocol.

In response to the memory grant signal MEMGRANT on line 424, the control logic 360 controls the base address register 350 via control lines 361 to output the contents of the base address register 350 on the memory address bus MEMADDR 430 via the adder 366. At this stage, the index register is cleared, and therefore the memory address on bus MEMADDR 430 is the contents of the base address register alone, having had the value zero added thereto. The data accessed from the data SRAM 400 by the memory address on bus MEMADDR 430 is received on the memory read data bus MEMRDDATA 428 and forms an input to the comparator 362. The comparator 362 compares this accessed data with the PID in the match data register 352, and outputs the result thereof to the control logic 360 via line 374.

If the comparator 362 does not find a match, then the control logic 360 controls the incrementer 368 to increment the value of the index register 358 by one address location, such that this is added to the value in the base address register 350, the value of the memory address on bus MEMADDR 430 thereby increasing by one memory location. Again, the accessed data at this memory location is returned on the memory read data bus MEMRDDATA 428 and compared in the comparator 362. The operation of the search engine continues in this way until a match is found between the PID in the match data register 352 and the accessed data on the memory data bus MEMRDATA 428, or until each memory location storing a possible PID value has been accessed without a valid comparison being made.

Each time the control logic 360 controls the incrementer 368 to increase the value in the index register 358, the comparator 364 compares the value in the index register 358 with the value in the size register 354. Once the value in the index register reaches the value in the size register 354, the comparator 364 sets its output on line 379 to the control logic 360. In response to the signal on line 379, the control logic 360 clears the operate register 356 to terminate operation of the search engine. Thus, in this way the search engine searches through the address range determined by the size register 354, and if no match is found, the operation of the search engine is terminated.

If the PID in the match data register 352 is successfully matched to a PID stored in the data SRAM, the comparator 362 indicates a match by setting its output on line 374 and, in response to the appropriate signal on line 374, the control logic 360 terminates the search operation by clearing the operate register 356, and the value stored in the index register will be the offset address of the matched PID from the base address register 350.

The transport controller can monitor the state of the operate register 356 via the transport controller read data bus TCRD-DATA 412, and when it detects that the search operation has been finished by the operate register 356 being cleared, the transport controller reads the contents of the index register 358 via the transport controller address bus 414. The most significant bit of the index register will be reserved to indicate whether a valid PID has been identified or not. That is, if the most significant bit of the index register is not set, then this will be indicative of the fact that the index register 358 includes a value of the offset of the stored PID from the base address value. However, if the search has not found a match to the PID, the most significant bit of the index register 358 will be set (by the control logic 360 responsive to a signal on line 379 from the computer 364 indicating a match) and the transport controller will identify the setting of this bit and discard the incoming transport packet.

From the value of the base address register 350 and the value of the index register 358, where a match of the PID has been found, the transport controller will be able to identify the address to access in the data SRAM 400 to locate various fields associated with the transport packet header. This operation will be described further hereinbelow with reference to FIG. 5.

It will be appreciated from the foregoing description that both the search engine via interconnect bus 406 and the transport controller core via interconnect bus 404 can access the data SRAM 400. Therefore, some means of arbitration is provided between the transport controller core 320 and the search engine 322 to determine which has access to the data SRAM 400 in the event of a conflict caused by attempted simultaneous access. Such arbitration may be provided by any circuitry known in the art, and the arbitration would preferably be such that the search engine always has priority over the transport controller core for access to the data SRAM 400.

The data associated with each PID which is to be accessed from the data SRAM is preferably stored in several arrays of structures, each array being directly linked to the other with pointers precalculated by the system processor at initialization time for fast access to information. The data associated with each PID which the transport controller core accesses is dependent upon the particular operations which might be necessary on the transport stream. For example, the payload of the transport stream may be scrambled, and the PID may have associated therewith stored in the data SRAM the appropriate descrambler keys which need to be returned via lines 112 from the transport controller 200 to the input module 100 for descrambling the transport packet payload. In addition, the PID is used to access information from the data SRAM which indicates whether the transport packet payload is audio or video information which can be passed straight through the transport controller 200 to its output 502, or whether the payload of the transport packet is a section which must be filtered, preferably by being passed to the section filter 312 of the transport controller 200 for filtering, or alternatively under direct control of the transport controller core. There is also preferably information associated with the PID and stored in the data SRAM 400 concerning the status of buffers of the DMA controller 500.

The splitting of the different information associated with a PID into independent arrays of structures allows the size of the overall information to be compact and gives more flexibility in configuration of the memory. Every PID can in fact have parts of data associated therewith in common with other PIDs, for example the same set of descrambling keys, and thus this set of descrambling keys, which may be associated with several PIDs, need only be stored once. The different PID types do not all require one instance of all the structures, for example information concerning the section filter status is needed only by transport packets which are sections, and not by other transport packets. This can also allow, with the same size of data SRAM available, the use of a different mix of PID types by just re-sizing the arrays of the DMA controller 500, section filter 312, and descrambling key arrays.

Figure 5:
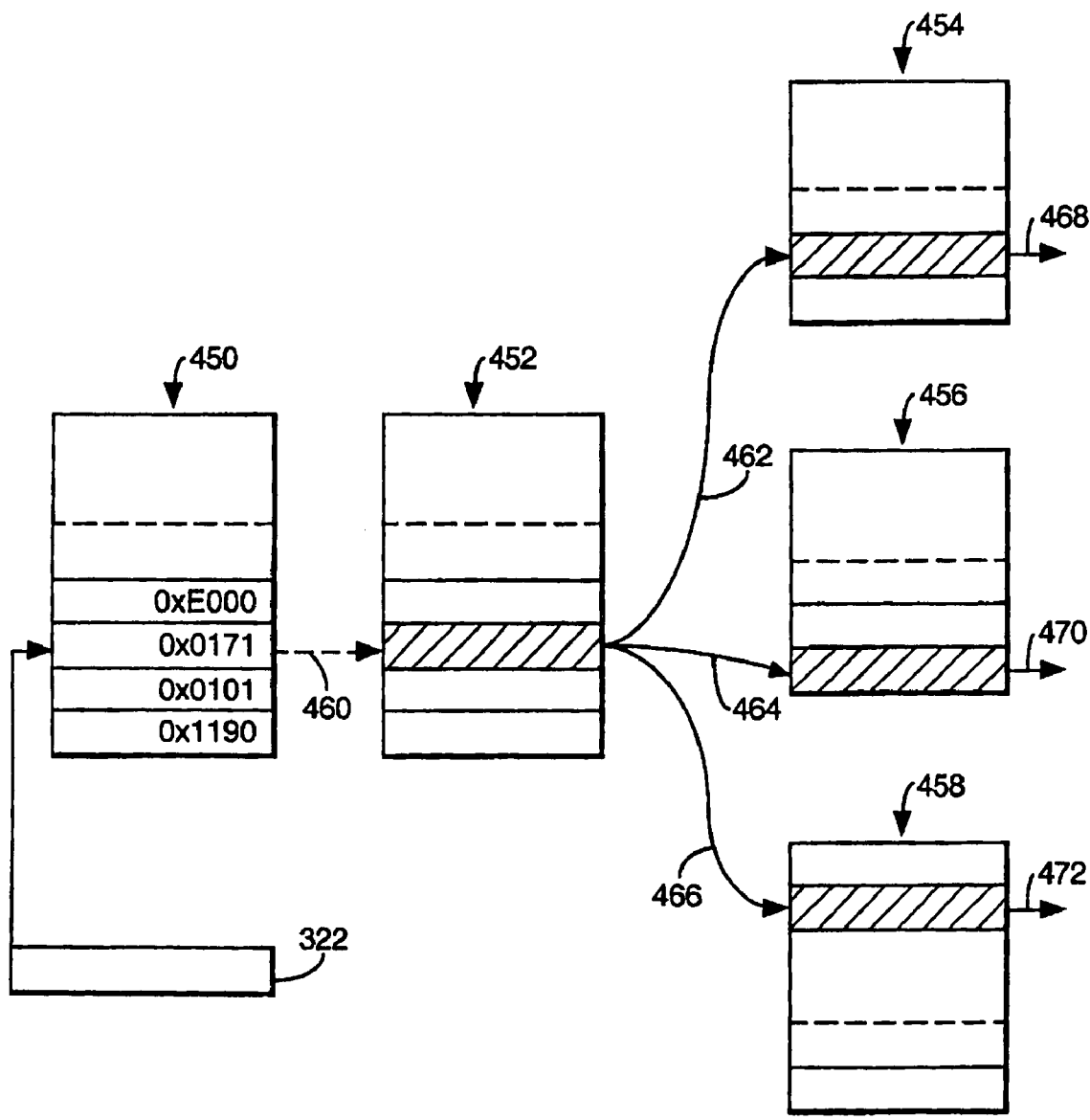
FIG. 5 illustrates schematically the advantageous interconnection of arrays, associated with transport packets, in the memory of the programmable transport interface of FIG. 2.

Referring to FIG. 5, the data SRAM 400 includes a look-up table 450 which contains the active PIDs currently allocated. In the preferred embodiment this is an array of 48 locations, each location containing the value of an active PID. In addition there is an array 452 that keeps the information of the stream status and the links with all the other arrays stored in the data SRAM. The slots, or sectors, of these arrays 450 and 452 are linked such that information from the same PID resides at the same array offset. This gives a swift link between the arrays 450 and 452.

Once the main PID data is accessed, it is possible to check the status and configuration of the stream demultiplexing in the status words and get links to the output buffers of the DMA controller 500, keys for descrambling for use in the input module 100, and section filter status structures for use in section filtering by the section filter 312. These links are in the format of pointers to the beginning of the correct structure of data needed.

Referring to FIG. 5, there is shown an example in which the PID of the current transport packet is 171. Thus the search engine 322 is pointing to this PID in the PID look-up table 450, the PID look-up table 450 being the array through which the search engine searches for the current PID of the current transport packet. The PID 171 in the PID look-up table 450 points via pointer 460 to an array 452 of PID main information. The PID main information includes, typically, status words and pointers to the other fields. Thus, the array of PID main information for the PID of 171 points, in this example, via pointer 462 to the array of section filter states 454 (the message packet is a section) and the appropriate output 468 is generated for use by the section filter. The array of PID main information 452 also points via pointer 464, in the case where the payload of the transport packet is scrambled, to the array of descrambling keys 456. The output 470 is the appropriate descrambling key for use by the input module 100. The array of PID main information also points via pointer 466 to the array of DMA configurations 458 and output 472 outputs the appropriate configuration information for use by the DMA controller 500.

Each of the outputs 468, 470, and 472 are provided to the transport controller core 320 via the interconnect bus 404. the transport controller then takes the necessary action in accordance with information retrieved from the data SRAM.

Figure 6:
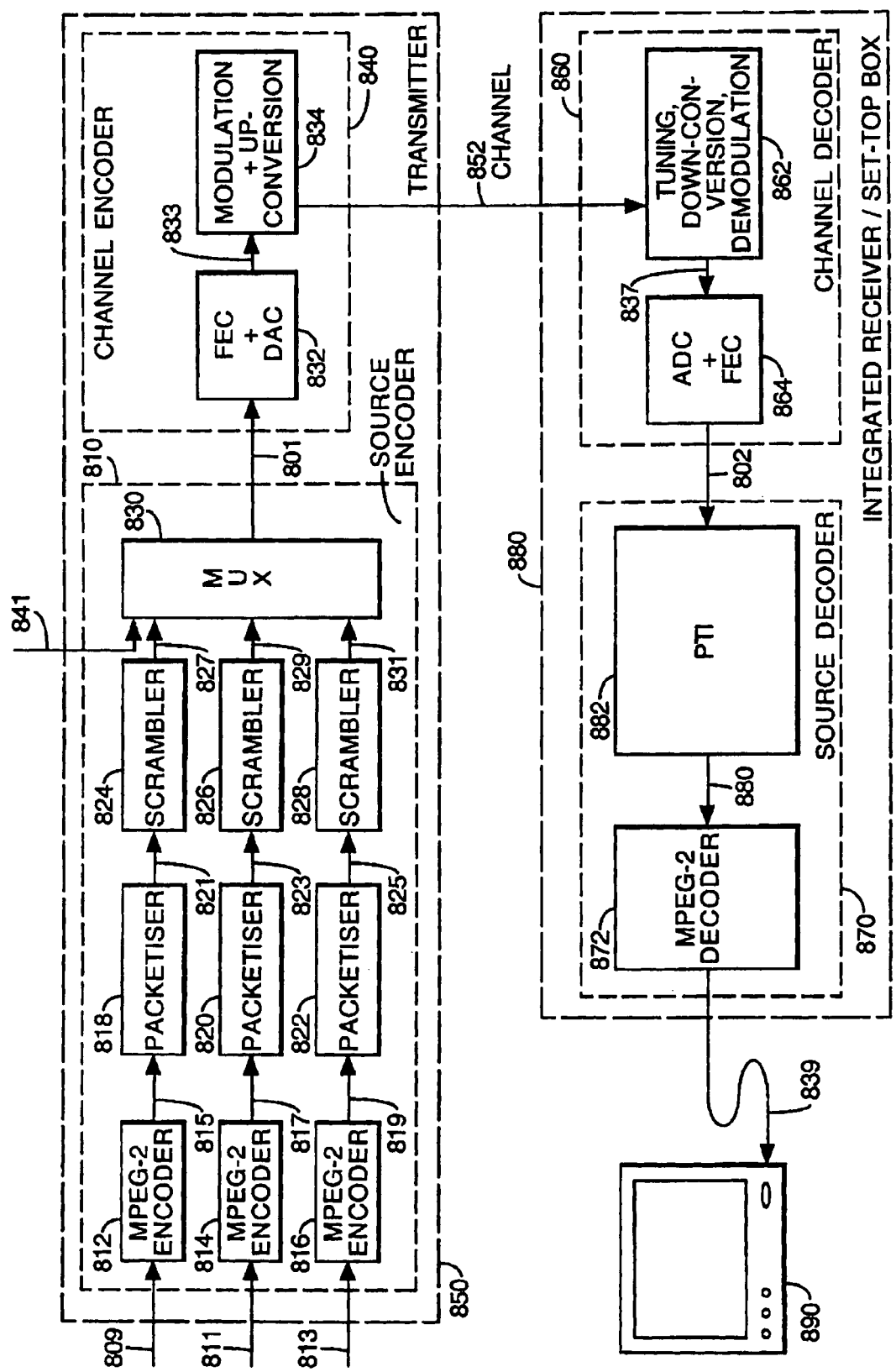
FIG. 6 illustrates a digital broadcast system incorporating a programmable transport interface according to the present invention.

FIG. 6 illustrates an application of a programmable transport interface, according to the present invention, in a digital television system.

FIG. 6 illustrates how digital television signals 809, 811, and 813 can be transmitted via a cable, satellite or terrestrial television channel 852 and be viewed on a television 890. The first, second and third television signals 809, 811 and 813 each represent the audio and video signals necessary to recreate a television program on input to a television. The digital television signals 809, 811 and 813 are source encoded and channel encoded by a transmitter 850 to produce a modulated analog signal for transmission on the channel-852. An integrated receiver decoder (also known as a set-top-box) 880 receives the modulated analog signal from the channel 852 and produces a video signal 839 which operates the television 890.

The operation of the transmitter 850 will now be explained. The transmitter includes a source encoder 810 and a channel encoder 840. The source encoder includes—first, second and third MPEG-2 encoders 812, 814 and 816; first second and third packetizers 818, 820 and 822; first, second and third scramblers 824, 826 and 828 and a multiplexer 830. The first, second and third MPEG-2 encoders respectively receive the first 809, second 811 and third 813 television signals and encode the signals to produce first, second and third elementary bit streams 815, 817 and 819. The first 818, second 820 and third 822 packetizers respectively receive the first 815, second 817 and third 819 elementary bit streams and packetize the elementary bit streams to produce first, second and third packetized elementary bit streams (PES) 821, 823 and 825. The packetizing of an elementary bit stream includes creating a series of packets which contain a packet header and a data portion, but which do not have any fixed length. The first 824, second 826 and third 828 scramblers receive respectively the first 821, second 823 and third 825 packetized elementary bit streams (PES) and produce first, second, and third scrambled PES 827, 829 and 831. Each of the scramblers scrambles only the data portion of each packetized elementary bit stream it receives and does not scramble the packet header.

The multiplexer 830 receives as inputs packetized sections of tables on line 841, and the first, second and third scrambled PES 827, 829 and 831, and produces a transport stream from one of its inputs on line 801. The packetized sections of tables 841 contain information which allows the set-top-box 880 to effect source decoding and produce the video signals 839. The information is stored in a tabular format where each table contains a number of sections and each section is transmitted individually.

The multiplexer 830 produces a transport stream 801 such as that illustrated in FIG. 1 as discussed in detail hereinabove. The transport stream includes a number of transport packets 2 wherein each transport packet contains a transport packet header 4 and a transport packet payload 6. The transport packets have a fixed length. In the digital MPEG-2 video broadcast (DVB) standard the transport packet is 188 bytes in length. The transport packets are shorter in length than the packets in the packetized elementary stream (PES). Consequently, a packet from the first scrambled PES 827 will be spread over a number of transport packets and these transport packets will be multiplexed with transport packets derived from the packetized sections of tables 841 and the second and third scrambled PES 829, 831. The transport stream is then supplied on line 801 to the channel encoder 840 to produce the modulated analog signal for transmission on the channel 852.

The channel encoder 840 includes circuitry 832 for forward error correcting (FEC) the transport stream on line 801 and a digital-to-analog converter (DAC) for converting the signal from digital to analog to produce an analog signal 833. The analog signal 833 is modulated and up-converted to a transmission frequency by the circuit 834 to produce the modulated analog signal which is then transmitted into the channel 852.

The operation of the set-top-box 880 will now be explained. The set-top-box 880 includes a channel decoder 860 and a source decoder 870. The channel decoder 860 receives the modulated analog signal on the channel 852 and produces the transport stream 802 which it supplies to the source decoder 870.

The channel decoder 860 includes circuitry 862 for tuning to the modulated analog signal on the channel 852, and for down-converting and demodulating the modulated analog signal on the channel 852 to produce an analog signal 837. The analog signal 837 is converted from analog to digital in an analog to digital converter (ADC) and forward error corrected (FEC) by the circuitry 864 to reproduce the transport stream as signal 802.

The source decoder 870 receives the transport stream 801 and produces the video signal 839. The source decoder 870 includes a programmable transport interface (PTI) 882 and MPEG-2 decoder 872. The PTI 960 demultiplexes the transport stream 802, selects the transport packets 2 carrying information relating to a particular television program, and descrambles these selected transport packets to produce a data output stream 880, which is, in fact, the packetized elementary bit stream associated with the selected television program. The MPEG-2 decoder 872 receives the data output stream 880 and produces the video signal 839 which is supplied to the television 890. The television 890 displays the selected television program.

Figure 7:
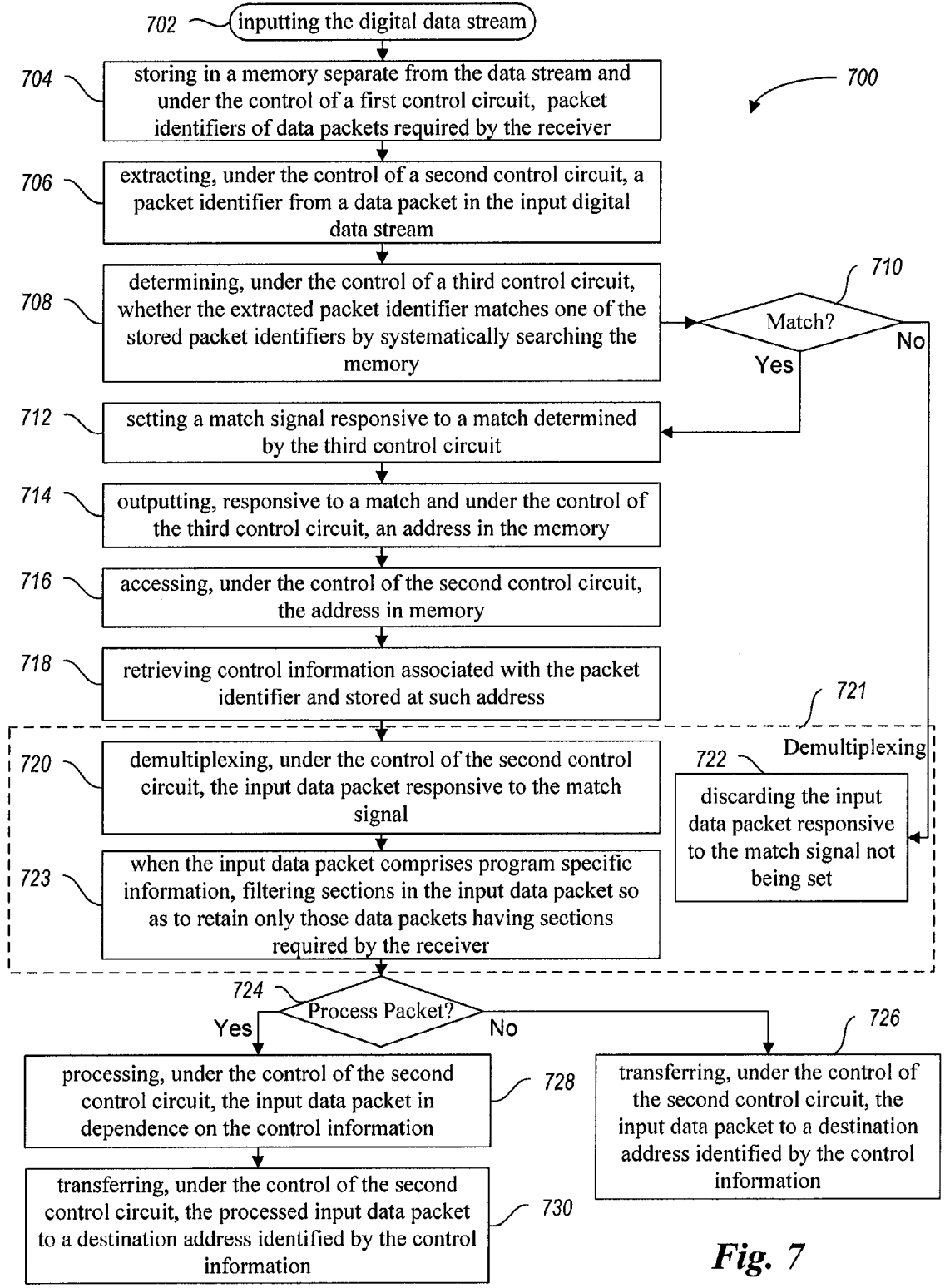
FIG. 7 is a mid-level flow diagram illustrating an embodiment of a method demultiplexing a digital data stream input to a receiver.

FIG. 7 illustrates an embodiment of a method 700 of demultiplexing a digital data stream input to a receiver, the digital data stream including data packets each having a packet identifier, so as to retain only those data packets required by the receiver, the method comprising the steps of: inputting 702 the digital data stream; storing 704 in a memory separate from the data stream and under the control of a first control circuit, packet identifiers of data packets required by the receiver; extracting 706, under the control of a second control circuit, a packet identifier from a data packet in the input digital data stream; determining 708, under the control of a third control circuit, whether the extracted packet identifier matches one of the stored packet identifiers by systematically searching the memory; setting a match signal 712 responsive to a match determined by the third control circuit; outputting 714, responsive to a match and under the control of the third control circuit, an address in the memory; accessing 716, under the control of the second control circuit, the address in memory; retrieving 718 control information associated with the packet identifier and stored at such address; and demultiplexing 722, under the control of the second control circuit, the input data packet responsive to the match signal. In one embodiment, the method 700 further comprises the step of transferring 726, under the control of the second control circuit, the input data packet to a destination address identified by the control information. In one embodiment, the method 700 further comprises the steps of: determining 724 whether processing of the packet is desired; if so processing 728, under the control of the second control circuit, the input data packet in dependence on the control information; and transferring 730, under the control of the second control circuit, the processed input data packet to a destination address identified by the control information. In the illustrated embodiment, the step of demultiplexing 721 comprises discarding 722 the input data packet responsive to the match signal not being set. In one embodiment, when the input data packet comprises program specific information, said demultiplexing 721 step comprises filtering 723 sections in the input data packet so as to retain only those data packets having sections required by the receiver.

Figure 8:
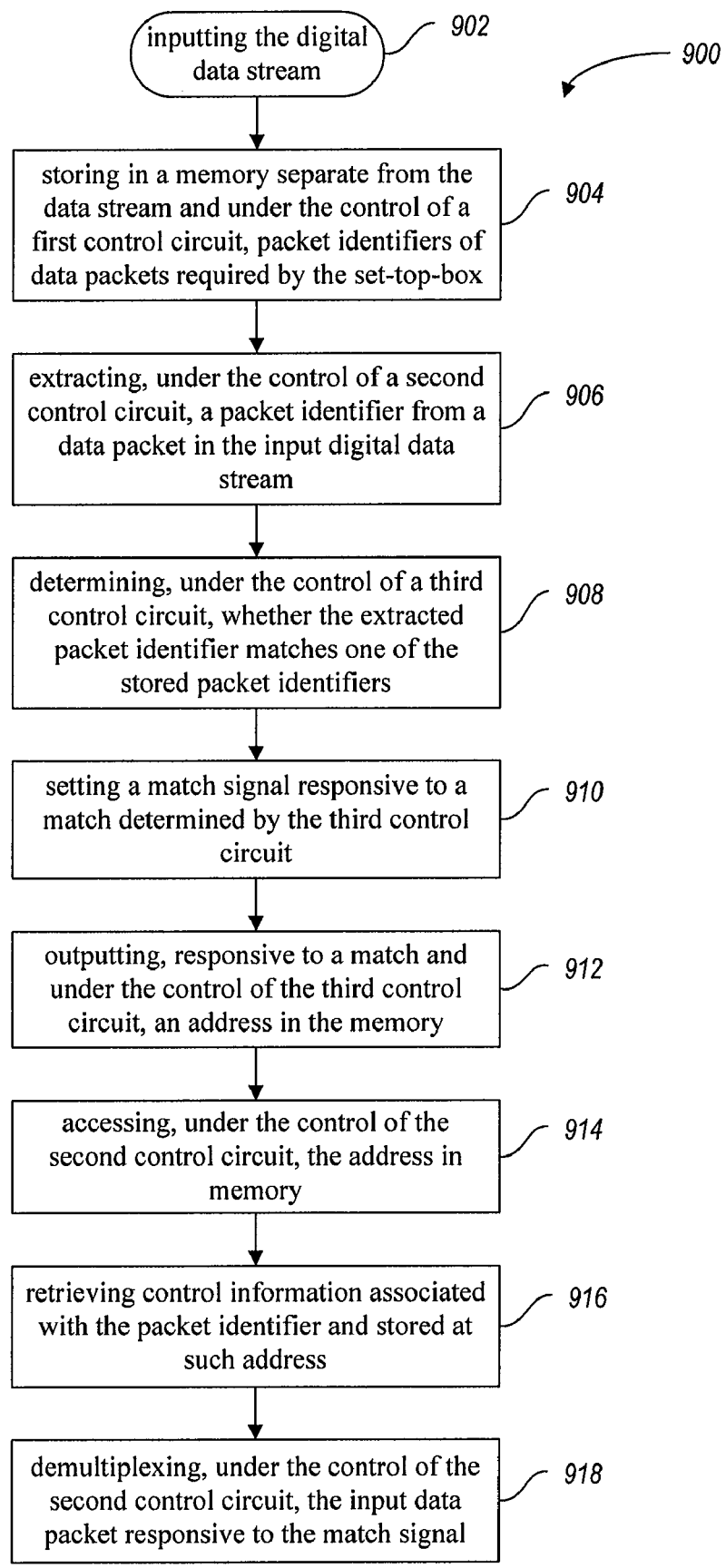
FIG. 8 is a mid-level flow diagram illustrating an embodiment of a method of decoding a broadcast digital data signal in a set-top-box.

FIG. 8 is a mid-level flow diagram illustrating an embodiment of a method 900 of decoding a broadcast digital data signal in a set top box, the method comprising: inputting 902 the digital data stream; storing 904 in a memory separate from the data stream and under the control of a first control circuit, packet identifiers of data packets required by the set-top-box; extracting 906, under the control of a second control circuit, a packet identifier from a data packet in the input digital data stream; determining 908, under the control of a third control circuit, whether the extracted packet identifier matches one of the stored packet identifiers; setting a match signal 910 responsive to a match determined by the third control circuit; outputting 912, responsive to a match and under the control of the third control circuit, an address in the memory; accessing 914, under the control of the second control circuit, the address in memory; retrieving 916 control information associated with the packet identifier and stored at such address; and demultiplexing 918, under the control of the second control circuit, the input data packet responsive to the match signal.

Figure 9:
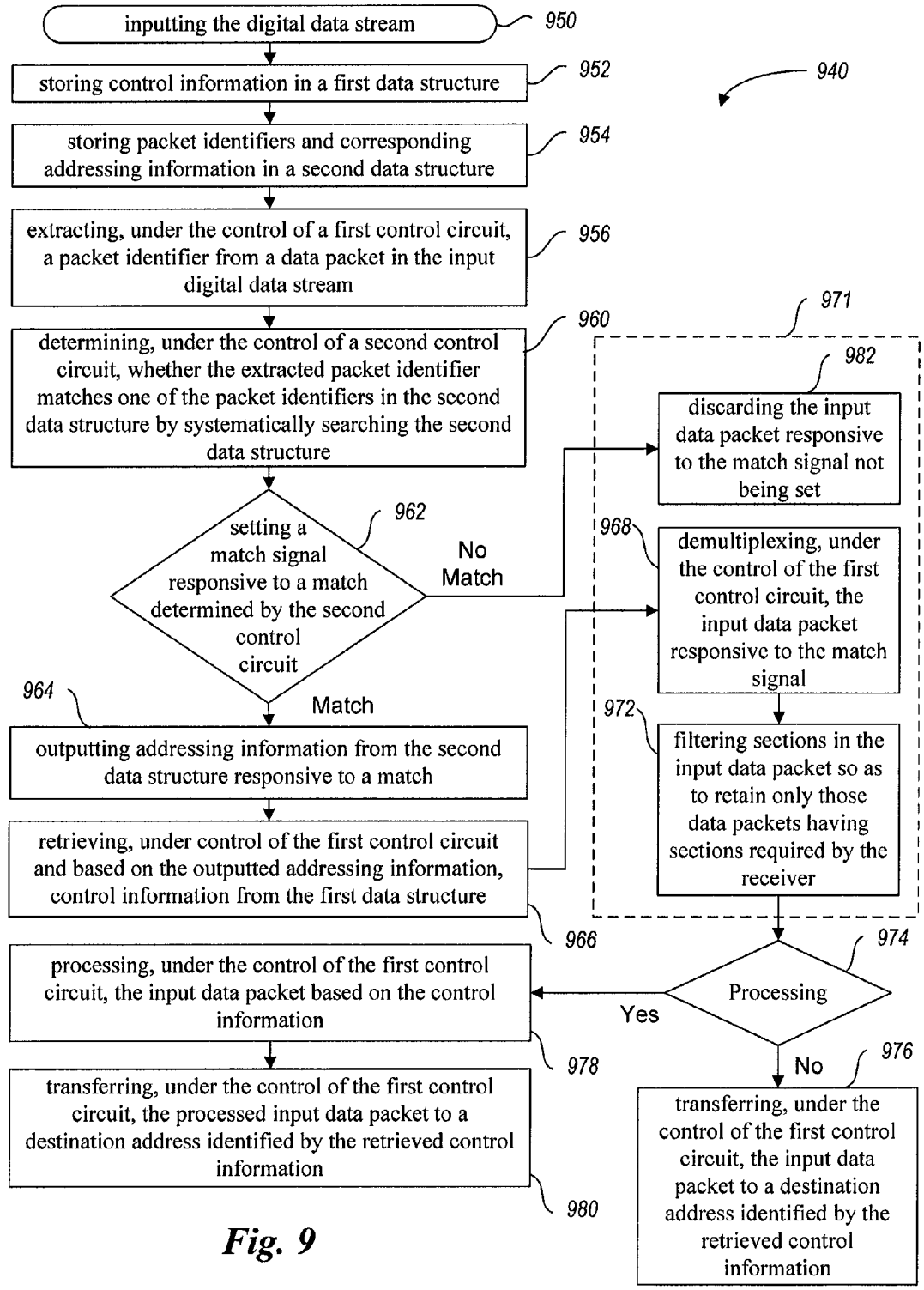
FIG. 9 is a mid-level flow diagram illustrating an embodiment of a method demultiplexing a digital data stream input to a receiver.

FIG. 9 is a mid-level flow diagram illustrating an embodiment of a method 940 of demultiplexing a digital data stream input to a receiver, the digital data stream including data packets each having a packet identifier, so as to retain only those data packets required by the receiver. The method comprises the steps of: inputting 950 the digital data stream; storing 952 control information in a first data structure; storing 954 packet identifiers and corresponding addressing information in a second data structure; extracting 956, under the control of a first control circuit, a packet identifier from a data packet in the input digital data stream; determining 960, under the control of a second control circuit, whether the extracted packet identifier matches one of the packet identifiers in the second data structure by systematically searching the second data structure; setting a match signal 962 responsive to a match determined by the second control circuit; outputting 964 addressing information from the second data structure responsive to a match; retrieving 966, under control of the first control circuit and based on the outputted addressing information, control information from the first data structure; and demultiplexing 971, under the control of the first control circuit, the input data packet responsive to the match signal. The step of demultiplexing 971 as illustrated comprises demultiplexing 968, under the control of the first control circuit, the input data packet responsive to the match signal. The illustrated embodiment further comprises the optional step of: transferring 976, under the control of the first control circuit, the input data packet to a destination address identified by the retrieved control information. The illustrated embodiment further comprises the optional steps of: processing 978, under the control of the first control circuit, the input data packet based on the control information; and transferring 980, under the control of the first control circuit, the processed input data packet to a destination address identified by the retrieved control information. In the illustrated embodiment, the step of demultiplexing 971 comprises discarding 982 the input data packet responsive to the match signal not being set. In the illustrated embodiment, when the input data packet comprises program specific information, the demultiplexing 971 comprises: filtering 972 sections in the input data packet so as to retain only those data packets having sections required by the receiver.

Figure 10:
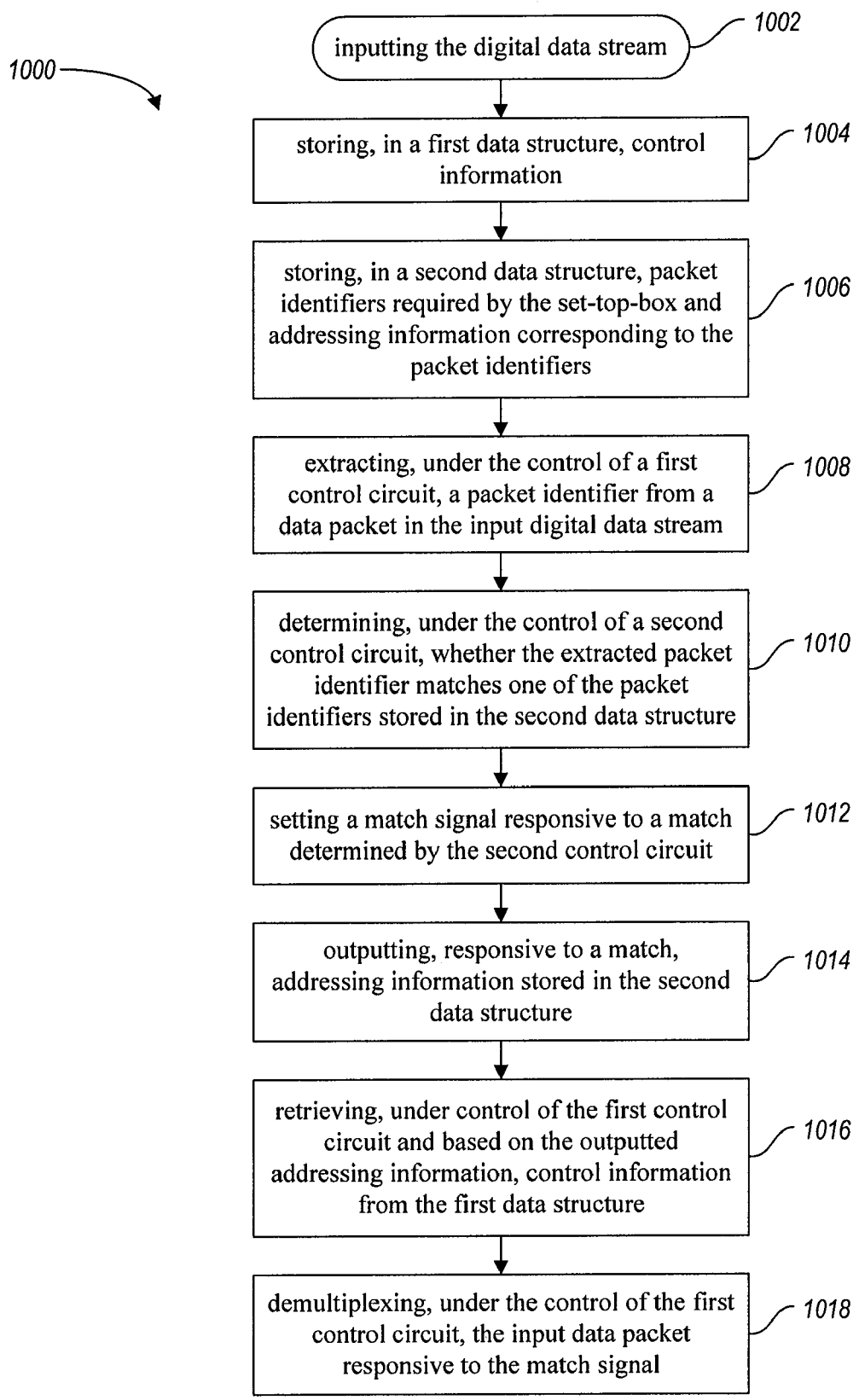
FIG. 10 is a mid-level flow diagram illustrating an embodiment of a method of decoding a broadcast digital data signal in a set-top-box.

FIG. 10 is a mid-level flow diagram illustrating an embodiment of a method 1000 of decoding a broadcast digital data signal in a set top box. As illustrated, the method 1000 comprises: inputting 1002 the digital data stream; storing 1004, in a first data structure, control information; storing 1006, in a second data structure, packet identifiers required by the set-top-box and addressing information corresponding to the packet identifiers; extracting 1008, under the control of a first control circuit, a packet identifier from a data packet in the input digital data stream; determining 1010, under the control of a second control circuit, whether the extracted packet identifier matches one of the packet identifiers stored in the second data structure; setting a match signal 1012 responsive to a match determined by the second control circuit; outputting 1014, responsive to a match, addressing information stored in the second data structure; retrieving 1016, under control of the first control circuit and based on the outputted addressing information, control information from the first data structure; and demultiplexing 1018, under the control of the first control circuit, the input data packet responsive to the match signal.

We claim:

1. A receiver for demultiplexing a digital data stream, the digital data stream including data packets each having a packet identifier, so as to retain only those data packets required by the receiver, the receiver comprising:
an input module for receiving and processing the digital data stream;
a memory for storing packet identifiers corresponding to data packets required by the receiver and separate from the input module;
a first control circuit for controlling the storage in the memory of the packet identifiers;
a second control circuit for extracting a packet identifier from a data packet in the digital data stream; and
a third control circuit for receiving the extracted packet identifier and determining whether such matches one of the packet identifiers stored in the memory, for setting a match signal to the second control circuit responsive to a match, and for outputting an address in the memory responsive to a match, wherein the second control circuit accesses the address in the memory to retrieve control information associated with the packet identifier and controls processing by the input module of the input data packet responsive to the match signal by the third control circuit.

2. The receiver of claim 1 wherein responsive to the control information the second control circuit controls the transfer of the input data packet to a destination address identified by the control information.

3. The receiver of claim 1, wherein responsive to the control information the second control circuit retrieves a data payload from the input module, processes the data payload and transfers the processed data payload to a destination address identified by the control information.

4. The receiver of claim 1 wherein responsive to the match signal not being set, the second control circuit instructs the input module to discard the input data packet.

5. The receiver of claim 1 in which the digital data stream is an MPEG-2 encoded stream.

6. The receiver of claim 2 in which the input data packet comprises a packetized elementary stream.

7. The receiver of claim 3 in which the data payload comprises program specific information, and the receiver further comprises a filter controlled by the second control circuit for filtering sections in the data payload so as to retain only those data packets having sections required by the receiver.

8. The receiver of claim 1 in which first control circuit is a receiver processor, the second control circuit is a transport processor, and the third control circuit is a search engine.

9. A set-top-box including a receiver for demultiplexing a digital data stream, the digital data stream including data packets each having a packet identifier, so as to retain only those data packets required by the receiver, the receiver comprising:
an input module for receiving the digital data stream;
a memory for storing packet identifiers corresponding to data packets required by the receiver and separate from the input module;
a first control circuit for controlling the storage in the memory of the packet identifiers;
a second control circuit for extracting a packet identifier from a data packet in the digital data stream; and
a third control circuit for receiving the extracted packet identifier and determining whether such matches one of the packet identifiers stored in the memory, for setting a match signal to the second control circuit responsive to a match, and for outputting an address in the memory responsive to a match, wherein the second control circuit accesses the address in the memory to retrieve control information associated with the packet identifier and controls processing by the input module of the input data packet responsive to the match signal by the third control circuit.

10. A method of demultiplexing a digital data stream input to a receiver, the digital data stream including data packets each having a packet identifier, so as to retain only those data packets required by the receiver, comprising the steps of:
inputting the digital data stream;
storing in a memory separate from the data stream and under the control of a first control circuit, packet identifiers of data packets required by the receiver;
extracting, under the control of a second control circuit, a packet identifier from a data packet in the input digital data stream;
determining, under the control of a third control circuit, whether the extracted packet identifier matches one of the stored packet identifiers;
setting a match signal responsive to a match determined by the third control circuit;
outputting, responsive to a match and under the control of the third control circuit, an address in the memory;
accessing under the control of the second control circuit, the address in memory;
retrieving control information associated with the packet identifier and stored at such address; and
demultiplexing, under the control of the second control circuit, the input data packet responsive to the match signal.

11. The method of claim 10 further comprising the step of:
transferring, under the control of the second control circuit, the input data packet to a destination address identified by the control information.

12. The method of claim 10 further comprising the steps of:
processing, under the control of the second control circuit, the input data packet in dependence on the control information; and
transferring, under the control of the second control circuit, the processed input data packet to a destination address identified by the control information.

13. The method of claim 10 in which the step of demultiplexing comprises discarding the input data packet responsive to the match signal not being set.

14. The method of claim 10 in which the digital data stream is an MPEG-2 encoded stream.

15. The method of claim 14 in which the input data packet comprises a packetized elementary stream.

16. The method of claim 14 in which the input data packet comprises program specific information, and wherein said demultiplexing step comprises:
filtering sections in the input data packet so as to retain only those data packets having sections required by the receiver.

17. The method of claim 10 in which the step of determining a match comprises systematically searching the memory.

18. A method of decoding a broadcast digital data signal in a set-top-box comprising:
inputting the digital data stream;
storing in a memory separate from the data stream and under the control of a first control circuit, packet identifiers of data packets required by the set-top-box;
extracting, under the control of a second control circuit, a packet identifier from a data packet in the input digital data stream;
determining, under the control of a third control circuit, whether the extracted packet identifier matches one of the stored packet identifiers;
setting a match signal responsive to a match determined by the third control circuit;
outputting, responsive to a match and under the control of the third control circuit, an address in the memory;
accessing, under the control of the second control circuit, the address in memory;
retrieving control information associated with the packet identifier and stored at such address; and
demultiplexing, under the control of the second control circuit, the input data packet responsive to the match signal.

19. A receiver for processing a packetized digital data stream, the receiver comprising:
an input module to receive and process a data packet;
a memory;
a receiver processor to control storage of desired packet identifiers and associated control information in the memory; and
a transport controller having a transport processor to extract a packet identifier from a packet in the input module and a search engine to search the memory for a match of the extracted packet identifier to a desired packet identifier stored in the memory, wherein responsive to a match the transport processor retrieves from the memory control information associated with the desired packet identifier stored in the memory and controls processing of the received data packet by the input module based on the retrieved control information.

20. The receiver of claim 19 wherein the transport processor generates a control signal to control processing of a packet by the input module based on associated control information retrieved from the memory.

21. The receiver of claim 20 wherein the input module discards a packet in response to the control signal.

22. The receiver of claim 20 wherein the input module descrambles a packet in response to the control signal.

23. A receiver for processing a packetized digital data stream, the receiver comprising: an input module to receive and process a data packet; a memory; a receiver processor to control storage of desired packet identifiers and associated control information in the memory; and a transport controller having a transport processor to extract a packet identifier from a packet in the input module and a search engine to search the memory for a match of the extracted packet identifier to a desired packet identifier stored in the memory, wherein responsive to a match the transport processor retrieves from the memory control information associated with the desired packet identifier stored in the memory and controls processing of the received data packet by the input module based on the retrieved control information;

wherein the transport processor generates a control signal to control processing of a packet by the input module based on associated control information retrieved from the memory;

wherein the input module passes a data payload to the transport controller in response to the control signal.

24. A receiver for processing a packetized digital data stream, the receiver comprising: an input module to receive and process a data packet; a memory; a receiver processor to control storage of desired packet identifiers and associated control information in the memory; and a transport controller having a transport processor to extract a packet identifier from a packet in the input module and a search engine to search the memory for a match of the extracted packet identifier to a desired packet identifier stored in the memory, wherein responsive to a match the transport processor retrieves from the memory control information associated with the desired packet identifier stored in the memory and controls processing of the received data packet by the input module based on the retrieved control information;

wherein the transport processor generates a control signal to control processing of a packet by the input module based on associated control information retrieved from the memory;

wherein the input module passes a data payload to the transport controller in response to the control signal;

wherein the transport controller reformats the data payload based on the control information and passes the reformatted data payload to the input module for output in an alternative output stream.

* * * * *

UNITED STATES PATENT AND TRADEMARK OFFICE
CERTIFICATE OF CORRECTION

PATENT NO. : 7,730,515 B1  
APPLICATION NO. : 09/239907  
DATED : June 1, 2010  
INVENTOR(S) : Andrew MacCormack et al.

Page 1 of 2

It is certified that error appears in the above-identified patent and that said Letters Patent is hereby corrected as shown below:

Columns 19 & 20, Line 18-31
Claim 23, "A receiver for processing a packetized digital data stream, the receiver comprising: an input module to receive and process a data packet; a memory; a receiver processor to control storage of desired packet identifiers and associated control information in the memory; and a transport controller having a transport processor to extract a packet identifier from a packet in the input module and a search engine to search the memory for a match of the extracted packet identifier to a desired packet identifier stored in the memory, wherein responsive to a match the transport processor retrieves from the memory control information associated with the desired packet identifier stored in the memory and controls processing of the received data packet by the input module based on the retrieved control information; wherein the transport processor generates a control signal to control processing of a packet by the input module based on associated control information retrieved from the memory; wherein the input module passes a data payload to the transport controller in response to the control signal." should read as --The receiver of claim 20 wherein the input module passes a data payload to the transport controller in response to the control signal.--.

Column 20, Line 7-30
Claims 24, "A receiver for processing a packetized digital data stream, the receiver comprising: an input module to receive and process a data packet; a memory; a receiver processor to control storage of desired packet identifiers and associated control information in the memory; and a transport controller having a transport processor to extract a packet identifier from a packet in the input module and a search engine to search the memory for a match of the extracted packet identifier to a desired packet identifier stored in the memory, wherein responsive to a match the transport processor retrieves from the memory control information associated with the desired packet identifier stored in the memory and controls processing of the received data packet by the input module based on the retrieved control information; wherein the transport processor generates a control signal to control processing of a packet by the input module based on associated control information retrieved from the memory; wherein the input module passes a data payload to the transport controller in response to the control signal; wherein the transport Signed and Sealed this
Eleventh Day of January, 2011

David J. Kappos
*Director of the United States Patent and Trademark Office* controller reformats the data payload based on the control information and passes the reformatted data payload to the input module for output in an alternative output stream." should read as --The receiver of claim 23 wherein the transport controller reformats the data payload based on the control information and passes the reformatted data payload to the input module for output in an alternative output stream.--.